US011079736B2

(12) United States Patent
Robl

(10) Patent No.: US 11,079,736 B2
(45) Date of Patent: Aug. 3, 2021

(54) MEASUREMENT TRANSMITTER FOR A MULTISENSOR SYSTEM, ESPECIALLY AS FIELD DEVICE FOR PROCESS AUTOMATION TECHNOLOGY, AND METHOD FOR OPERATING THE MEASUREMENT TRANSMITTER

(71) Applicant: Endress+Hauser Conducta GmbH+Co. KG, Gerlingen (DE)

(72) Inventor: Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 20 days.

(21) Appl. No.: 16/282,721

(22) Filed: Feb. 22, 2019

(65) Prior Publication Data

US 2019/0187664 A1    Jun. 20, 2019

Related U.S. Application Data

(63) Continuation of application No. 13/395,471, filed as application No. PCT/EP2010/061934 on Jul. 17, 2010, now Pat. No. 10,310,485.

(30) Foreign Application Priority Data

Sep. 16, 2009    (DE) .................. 10 2009 029 495.3

(51) Int. Cl.
*G05B 19/408*    (2006.01)
*G05B 19/042*    (2006.01)

(52) U.S. Cl.
CPC ......... *G05B 19/408* (2013.01); *G05B 19/042* (2013.01); *G05B 2219/25274* (2013.01)

(58) Field of Classification Search
CPC ................ G05B 19/408; G05B 19/042; G05B 2219/25274

(Continued)

(56) References Cited

U.S. PATENT DOCUMENTS 6,567,518 B1 *    5/2003    Weir .................. H04Q 1/04
326/38
10,310,485 B2 *    6/2019    Robl .................. G05B 19/042
(Continued)

FOREIGN PATENT DOCUMENTS

DE    WO2009024481    *    2/2009

OTHER PUBLICATIONS

Berthelot, Partial and Dynamic reconfiguration of FPGAs: a top down design methodology for an automatic implementation (Year: 2006).*

*Primary Examiner* — Michael P Nghiem
*Assistant Examiner* — Dacthang P Ngo
(74) *Attorney, Agent, or Firm* — Mark A. Logan; Endress+Hauser (USA) Holding Inc.

(57) ABSTRACT

A measurement transmitter for a multisensor system for process automation technology, wherein the measurement transmitter, for processing in- and output signals, has a processor, which is connected with an interface, to which a sensor is connected for transmission of data via a transmission line. In communication between the processor and the interface, or the sensor and the interface, different transmission rates of data occur. In order to be able to connect to the measurement transmitter a plurality of sensors working with different principles of operation, and, in spite of the plurality of sensors, largely avoid errors in the data transmission, at least two sensors are present, wherein a function module is present in the interface for each sensor and the function module for each sensor is connected with such sensor via a dedicated transmission line.

8 Claims, 2 Drawing Sheets

(58) Field of Classification Search
USPC .......................................................... 702/188
See application file for complete search history.

(56) References Cited

U.S. PATENT DOCUMENTS

| | | | |
|---|---|---|---|
| 2005/0231348 A1* | 10/2005 | Roth | G01D 3/022 340/506 |
| 2006/0155517 A1* | 7/2006 | Dobbs | G06F 11/3058 702/188 |
| 2007/0139209 A1* | 6/2007 | Butalla, III | G08B 17/10 340/621 |
| 2008/0028187 A1* | 1/2008 | Casselman | G06F 13/409 712/37 |
| 2011/0251792 A1* | 10/2011 | Wittmer | G05B 19/0425 702/1 |

* cited by examiner

MEASUREMENT TRANSMITTER FOR A MULTISENSOR SYSTEM, ESPECIALLY AS FIELD DEVICE FOR PROCESS AUTOMATION TECHNOLOGY, AND METHOD FOR OPERATING THE MEASUREMENT TRANSMITTER

CROSS-REFERENCE TO RELATED APPLICATIONS

The present continuation application is related to and claims the priority benefit of U.S. patent application Ser. No. 13/395,471, now U.S. Pat. No. 10,310,485, filed on Mar. 12, 2012, International Patent Application No. PCT/EP2010/061934, filed Jul. 17, 2010, and German Patent Application No. 10 2009 029 495.3, filed on Sep. 16, 2009, the entire contents of which are incorporated herein by reference.

TECHNICAL FIELD

The invention relates to a measurement transmitter for a multisensor system, especially a field device for process automation technology, wherein the measurement transmitter, for processing in- and output signals, has a processor, which is connected with an interface, to which a sensor is connected for transmission of data via a transmission line, and wherein, in communication between the processor and the interface, or the sensor and the interface, different transmission rates of data occur. The invention also relates to a method for operating the measurement transmitter.

BACKGROUND

In process automation technology, one works with many different sensors. Thus, there are sensors, which sense fill level, conductivity, pressure, temperature, angular setting (e.g. on a machine) or pH-value, as well as applications such as optical sensors, which are embodied, for example, as turbidity sensors or absorption sensors. Also ion-sensitive sensors are applied, which sense, among other things, the nitrate content of a liquid. In order to process the input signals of these different sensors, a measurement transmitter is known, in the case of which these sensors are each connected to an adapter via a transmission line having a low transmission rate. The adapter is, in turn, connected via a central bus system with a central processor, wherein the bus system has a high transmission rate. Data are exchanged between the sensors and the processor bidirectionally via the adapter, wherein the adapter converts the high transmission rate of the bus system into the low transmission rate of the transmission line of the sensor and vice versa. In such case, for the most part, digital sensors with different protocols and transmission rates are used.

The bus system has only one channel to the adapter, which, thus, can connect the processor with only one sensor. That means that the processor can query, or communicate with, the sensors only one at a time. In the case of a large occurrence of data, the sensors influence one another in the query loop, which has a limited amount of time and, because of the slow working adapter, overlaps occur in the data transmission.

Moreover, the software, which runs in the processor, is modified during the manufacture of the measurement transmitter to match the predetermined number of sensors to be connected and the selected types of sensors.

SUMMARY

An object of the invention is, thus, to provide a measurement transmitter and a method for operating a measurement transmitter, wherein a plurality of sensors working with different principles of operation can be connected to the measurement transmitter, wherein, in spite of the plurality of sensors, occurrence of errors in data transmission is largely avoided.

According to the invention, the object is achieved by features including that at least two sensors are present, wherein a function module is present in the interface for each sensor and the function module of each sensor is connected with such sensor via a dedicated transmission line. The invention has the advantage that, for each sensor, a separate data transfer channel is formed via the function module to the processor. Thus the two sensors can communicate simultaneously with the processor, in each case, via its own module. Data overlapping is then excluded as a source of error. Simultaneously, sensors with different protocols and different data transmission rates can be connected to the measurement transmitter.

Not only sensors of the most varied configuration can be connected to the measurement transmitter as input circuitry, but, also, simultaneously also output circuitries, which likewise have the most varied of complexities and principles of operation and can work with the most varied of transmission rates. The function module is, in such case, matched to the particular input-, or output circuitry.

In an embodiment, the function module connected with the digital sensor is embodied as a UART interface.

In a further development, the interface is a component of the processor. In this way, a space saving variant of the measurement transmitter is implemented, which enables the installation of the measurement transmitter in switching units.

Advantageously, the interface is embodied as a central I/O controller in the form of a logic chip containing a predetermined amount of different and/or equal function modules, to which a plurality of sensors and output circuits are connectable. In such case, the input circuitry of the sensors and the output circuits are provided as expansion blocks, wherein each expansion block has an identification unit for identification of the expansion block connected with the processor, wherein the processor by means of a configuration bitstream connects the expansion block with at least one function module preinstalled in the logic chip. This has the advantage that different selection amounts of function modules are contained in different configuration bitstreams. Depending on device type, such as measurement transmitter, analyzer or sample taker and/or, depending on the type of expansion block, the processor can decide to configure the logic chip with another, suitable bitstream.

Alternatively, the interface is embodied as a central I/O controller in the form of a partially dynamically reconfigurable logic chip, in which the function module for each sensor is configured freely programmably. Before the programming, the reconfigurable logic chip is just a piece of hardware without functionality, in which is programmed by the processor such a functionality as a function module, that the function module is matched to the relevant sensor and can work together optimally. The function module programmed for a sensor comprises only a separate region on the reconfigurable logic chip. Such a logic chip is also referred to as an FPGA (field programmable gate array). Thus, there can be configured on this logic chip also yet other function modules, which are appropriate, for instance, for other sensors or other in- and output circuitry. The function modules are configured, in such case, under the direction of a control program running in the processor in the form of a microprocessor. The processor can, however, also be embodied as a hardware based, control unit with a corresponding flow control. When certain function modules on the reconfigurable logic chip are currently not required, their resources are available to be used for other function modules. The partial reconfiguration of the FPGA has the advantage that individual function modules within the structure can be changed.

In an embodiment, the configuration of the function modules occurs by means of a configuration bitstream, which is loaded into the configurable logic chip. The configuration bitstreams are normally stored in an external flash memory, wherein the loading process is initiated by the corresponding control program of the processor.

In a further development, an output circuit is connectable to the reconfigurable logic chip, wherein the output circuit is embodied as an actuator or a communication system or an electrical current output or an alarm system and, for each type of output circuit, a corresponding function module is configured in the reconfigurable logic chip. Also, for each output circuit, there is an interface contained in the reconfigurable logic chip and embodied as a function module. Therewith, there is no central bus system connecting the in- and output circuitries with one another. There is no need for an intelligence in the form of a microprocessor in the in- and/or output circuits, since the intelligence is already contained in the function modules in the reconfigurable logic chip. Therefore cost effective components can be used as in-, and, respectively, output circuits, wherein additional software development for programming the intelligence in the in-, and, respectively, output circuits does not need to be performed. Besides lacking the developmental effort, absent also is a maintenance effort on the finished device. Subsequently discovered circuit errors in the reconfigurable logic chip can be corrected at any time.

Advantageously, a plurality of sensors and output circuits are connectable to the reconfigurable logic chip, wherein the input circuitry of the sensors and the output circuits are provided as expansion blocks. Expansion blocks increase the flexibility of the measurement transmitter. Due to the reconfigurability of the logic chip, at any time, new function modules can be introduced into the logic chip, whereby various and, respectively, new protocols can be read in. Through an easy software update, in the future, also function modules can be configured for sensors, or circuit units, which are still not thought of today. In this way, the lifetime of the measurement transmitter is increased meaningfully.

In an embodiment, the expansion block has the identification unit for identification of the expansion block connected with the processor, which, based on the information provided by the identification unit, configures the function module in the reconfigurable logic chip. The identification module informs the processor about which type of circuit is arranged on the expansion block. When it is, for example, a sensor, simultaneously the exact sensor type is given. After the processor has obtained this information, it configures the corresponding function module in the logic chip.

In a further development, the expansion blocks are embodied as circuit board like, plug-in modules, wherein for each plug-in location, which is arranged on a central circuit board, on which are also arranged the processor and/or the reconfigurable logic unit, an identification is provided, which is made known to the processor with the information provided by the identification unit. Thus, the processor receives not only information concerning the type of circuitry, but also can assign the circuitry also equally a fixed position. Therefrom, it follows that that the function module is emplaced in such a manner in the reconfigurable logic circuit that the outputs of the logic circuit lead to the indicated plug-in location.

Advantageously, the identification unit of the expansion block communicates via a bus system with the processor. In such case, there are applied, for this communication, standard bus systems, such as, for example, an I2C bus, whereby the device concept becomes additionally less expensive.

In an embodiment, an expansion block includes a seat for an SD memory card, by means of which the software of the processor and/or hardware of the reconfigurable logic unit is updated. In this way, the flexibility of the measurement transmitter is increased, since also software is transmitted, which was still not known to the processor up to a predetermined point in time and whereby the measurement transmitter can be equipped with another functionality.

In a further development, an expansion block serves for operating a display- and/or service unit. Thus, not only is a representation of the processes running in the measurement transmitter possible, but also, control personnel can, using a guiding menu, access and influence the course of events in the measurement transmitter.

Advantageously, the expansion block serves for open and/or closed loop control of a sample taker. By means of such a sample taker, liquids or similar substances can be removed from the process to be monitored. These samples are forwarded to a laboratory for additional investigation.

In an embodiment, serves the expansion block for open and/or closed loop control of an analyzer. An analyzer not only withdraws a sample, but also analyzes such on-site and stores the result.

Advantageously, at least two expansion blocks embodied as plug-in cards are joined without housing between two lateral guiding walls and as such module further installed. In this way, an improved outflow of the heat produced by the circuits on the expansion blocks is possible. Heat blockage in a housing is, thus, prevented.

Another further development relates to a method for operating a measurement transmitter, especially as field device for process automation technology. In order to connect a plurality of sensors working with different principles of operation to the measurement transmitter and, in spite of the plurality of sensors, largely to exclude errors in the data transmission, method steps are provided as follows: Running a control program in the processor, obtaining information for identification of the expansion block, calling a function module corresponding to the expansion block, configuring on the dynamically reconfigurable logic chip a function module corresponding to the expansion block. This method provides an easy programming of the reconfigurable logic chip based on conditions predetermined by the expansion block.

Advantageously, the configuration phase occurs during the operational phase of the measurement transmitter. Thus, during operation, the expansion blocks can, at any time, be replaced or supplementally introduced on the measurement transmitter. The signals output by the identification system are immediately evaluated by the processor after the plugging in of a new expansion block and a function module corresponding to the expansion block configured in the reconfigurable logic circuit. If an expansion block replaced, then is in place of the function module, which corresponds to the removed expansion block, the new function module is configured.

In an embodiment, an area, which the function module occupies on the reconfigurable logic chip, is expanded or lessened. Thus, function modules of different complexity can be implemented on the logic chip.

BRIEF DESCRIPTION OF THE DRAWINGS

The invention permits numerous forms of embodiment. A selection of such embodiments will now be explained in greater detail based on the drawing, the figures of which show as follows.

DETAILED DESCRIPTION

Figure 1:
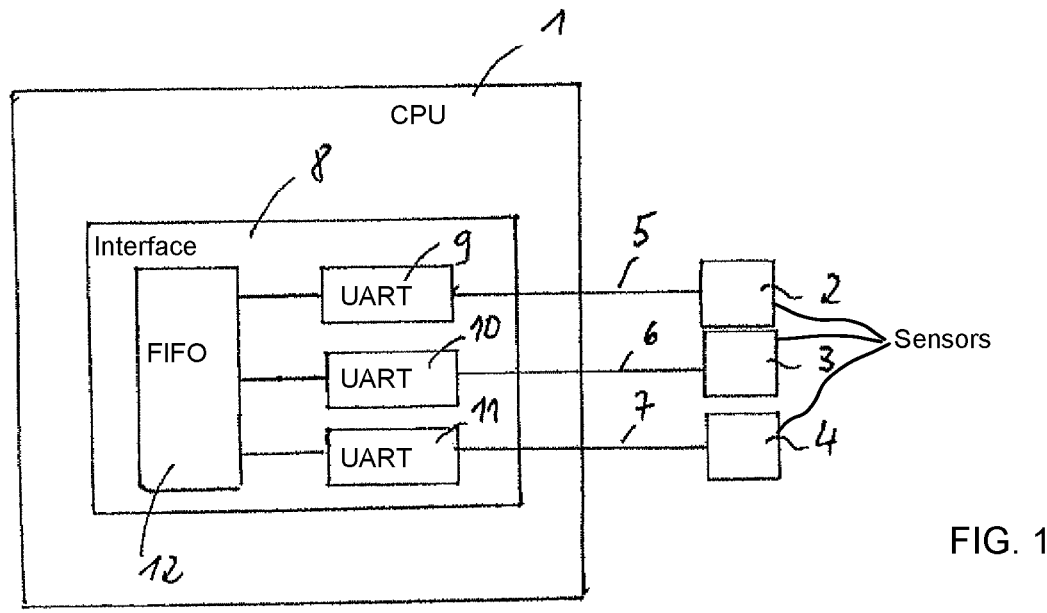
FIG. 1 is a first example of an embodiment of a control unit of a measurement transmitter with UART interfaces.

In the figures of the drawing, equal features are provided with equal reference characters.

FIG. 1 shows a CPU 1, which is connected with three external sensors 2, 3, 4, wherein the sensors 2, 3, 4 receive and issue digital signals. CPU 1 is arranged in a field device, which is located, for example, in a stream or river or in a wastewater- and clarification plant. The three sensors are arranged distributed at different locations. The sensors 2, 3, 4 are, for example, a water-level meter, a turbidity meter and an absorption meter. Each sensor 2, 3, 4 is connected via its own transmission line 5, 6, 7 to the CPU 1. Thus, sensor 2 is connected with transmission line 5, sensor 3 with transmission line 6 and sensor 4 with transmission line 7. The transmission lines 5, 6, 7 transmit the data of the individual sensors 2, 3, 4 with a transmission rate of 9.6 kbit/s.

For connecting the transmission lines 5, 6, 7, the CPU 1 has an interface 8. Arranged in this interface 8 for each sensor 2, 3, 4 is a UART interface. Such a UART interface serves for sending and receiving digital signals. For each sensor 2, 3, 4 there is, thus, an independent data channel present, via which the data of the individual sensors 2, 3, 4 can be downloaded by the CPU 1 in parallel. The data of sensor 2 travel via the data line 5 to the UART interface 9, while the data provided by sensor 3 are conveyed via the data line 6 to the UART interface 10. From the sensor 4, the data are forwarded via the transmission line 7 to the UART interface 11. All three UART interfaces 9, 10, 11 are connected with a FIFO memory 12, which provides the sensor data conditioned by the UART interfaces 9, 10, 11 to the CPU 1 for additional processing. A mutual influencing of the data of the different sensors 2, 3, 4 in the case of the data transmission is reliably avoided because of this circuit.

Figure 2:
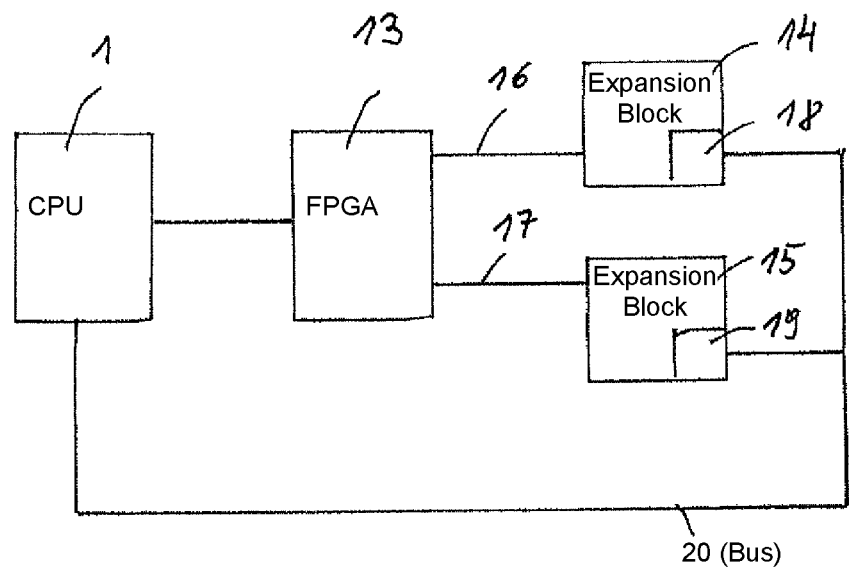
FIG. 2 is a second example of an embodiment of a control unit of a measurement transmitter with an FPGA.

FIG. 2 shows the CPU 1 connected with an FPGA (field programmable gate array) 13 contacted by expansion blocks 14, 15. Each of the expansion blocks 14, 15 is connected via its own transmission line 16, 17 to the FPGA 13. FPGA 13 serves in this embodiment as an I/O controller. FIG. 2 shows only two expansion blocks 14, 15 for better understanding. However, a greater number of expansion blocks can be connected to the FPGA 13. The expansion blocks 14, 15 are embodied as circuit board cards and can have different circuits, examples being a relay, electrical current connectors, binary inputs, e.g. for switch contacts, analog inputs, e.g. for sensors, as well as controllers, both open and closed loop. Also a communication system embodied as an intelligent system can be configured on an expansion block. Such communication systems include known fieldbusses, such as Ethernet, ModBus, Profibus, Foundation Fieldbus (FF), GSM or WLAN. Each expansion block 14, 15 includes a memory unit in the form of an EEPROM. Thus, expansion block 14 has EEPROM 18, while EEPROM 19 belongs to expansion block 15. The EEPROMs 18, 19 lead via an I2C bus 20 to the CPU 1.

Each expansion block 14, 15 is contacted at a plug-in location. Each plug-in location is coded with a number. After insertion of the expansion block 14, 15, CPU 1 receives from the EEPROM 18 or 19 belonging to the expansion block 14, 15, via the I2C bus 20, information concerning which type of circuit is arranged on which expansion block 14, 15. At the same time, the CPU 1 concerning is informed, at which plug-in location the expansion block 14, 15 is arranged. Proceeding on the basis of this information, the CPU 1 loads from a flash memory (not shown) function modules compatible with the reported expansion blocks 14, 15. If an expansion block reports as an electrical current output, then the function module of a freely programmable, pulse width modulation is called. If the expansion block 14, 15 is, for example, a relay, the function module comprises an on/off switch. If as expansion block a sensor is reported, then the already mentioned UART interface is loaded as function module. These function modules are configured in the FPGA 13 under the direction of a control program running in the CPU 1.

The FPGA 13 is first simply a piece of hardware without functionality, which has a large number of logic cells, which are interconnected via electronic switches. In a dynamic FPGA, which is used here, function modules are configured on demand, wherein the logic cells of these function modules are interconnected on demand via the electronic switches. Each function module is separately configured via a corresponding configuration bitstream, wherein the required configuration bitstreams are stored in an external flash memory and called by the control program of the CPU 1.

The expansion blocks 14, 15 can be replaced at any time, even during the on-going operation of the measurement transmitter, since, in the case of use of a new expansion block 14, 15, a report goes immediately from its EEPROM 18, 19 to the CPU 1, whose control program then triggers the configuration of the corresponding function module.

Figure 3:
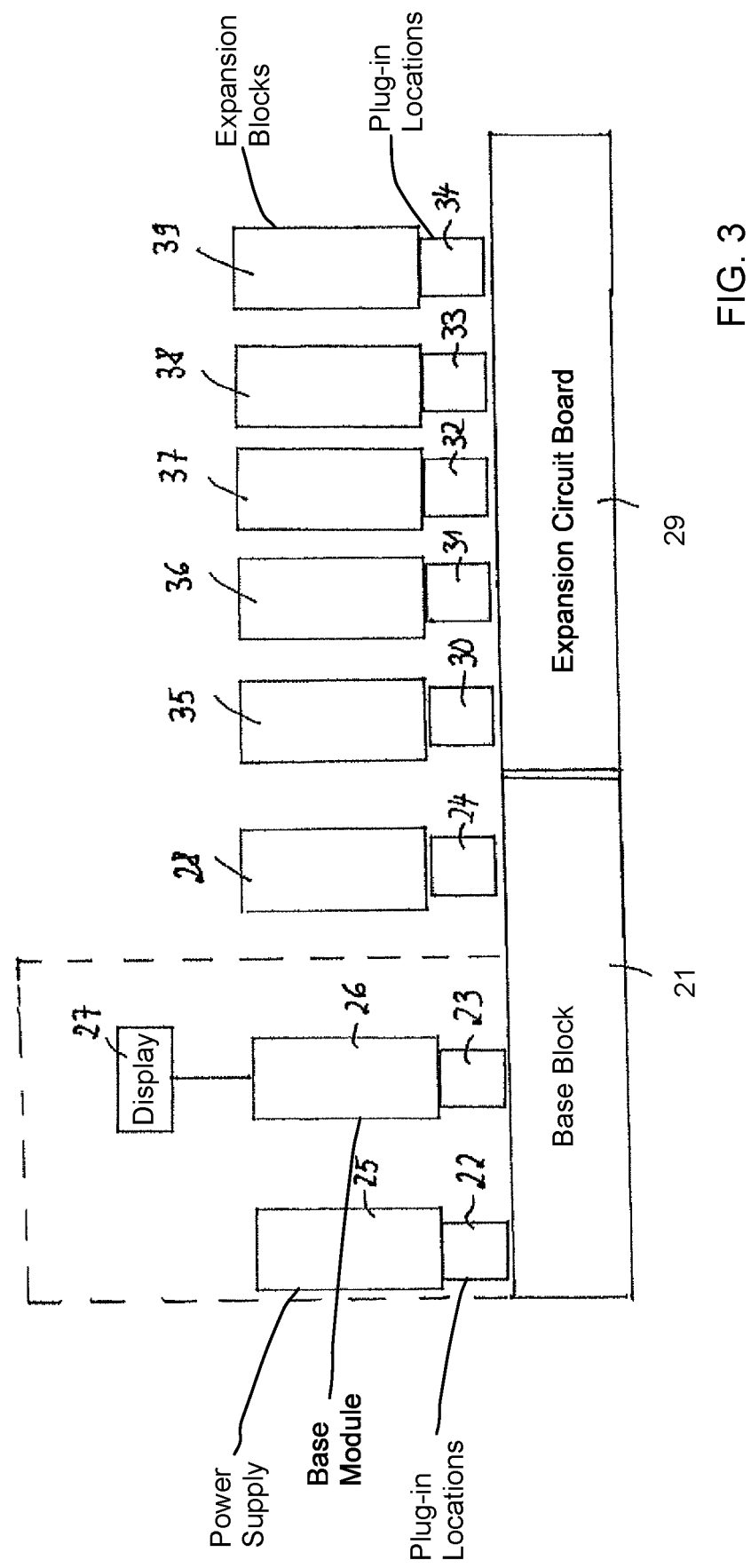
FIG. 3 is a schematic diagram of a measurement transmitter with a plurality of expansion circuits.

A form of embodiment for the construction of a measurement transmitter with the structure of the invention is presented in FIG. 3. This embodiment comprises a base block 21, which corresponds to a circuit board, on which all active components, such as the CPU, the FPGA, the flash memory and the working memory RAM are arranged. This base block 21 includes furthermore three plug-in locations 22, 23, 24, wherein, at the plug-in location 22, a power supply 25 for electrical current supply of the measurement transmitter is connected. Plugged-in at plug-in location 23 is a base module 26, on which connectors for two sensors are provided, which are connected via a cable with the base module 26. The base module 26 includes a slot for an SD memory card (not shown), by means of which new software can at all times be transmitted to the CPU 1, whereby new functionality can be placed in the measurement transmitter. Furthermore, the base module 26 is connected to a display 27, which is embodied as a display- and servicing module and can represent graphical data and evaluate inputs. The drive circuit of the display 27 is integrated in the described manner in the FPGA 13. In a simple variant, the display 27 is accommodated in the lid of the housing, where it is robustly and disturbance resistantly arranged. The third plug-in location 24 on the base block 21 is freely available and can be occupied by any desired expansion block 28.

If the one additional plug-in location 24 is not sufficient, there is provided on the base module 26 a rail, on which an expansion circuit board 29 is placed, on which five other plug-in locations 30, 31, 32, 33, 34 are present, where a maximum of five expansion blocks 35, 36, 37, 38, 39 can be connected. The expansion blocks 35, 36, 37, 38, 39 are, in such case, connectable to any of the plug-in locations 30, 31, 32, 33, 34. The operation of the measurement transmitter can, thus, be varied widely, depending on how many expansion blocks 28, 35, 36, 37, 38, 39 are required and depending on the types of the expansion blocks 28, 35, 36, 37, 38, 39. If, for example, a sample taker is to be implemented, besides the base block 21, the power supply 25 and the base module 26, only one further expansion block 28 is required, which comprises open loop controllers and, respectively, a closed loop controller. If, for example, an actuator is to be operated, then a programmable logic controller is an option as expansion block, which processes an output value of the CPU 1 and correspondingly activates the actuator.

In another variant, the FPGA 13 already includes a number of function modules, which are connected with expansion blocks by the configuration bitstream invoked by the CPU 1, as a function of which expansion blocks are present. This dynamic switching happens, in such case, by a selection of function modules already located statically in the FPGA 13. Thus, for example, a fixed number of UART interfaces are already programmed in the FPGA 13. A certain maximum number of UART interfaces from the predetermined fixed amount can be associated with each expansion plug-in location 22, 23, 24, 30, 31, 32, 33, 34. If an expansion block 14, 15, 28, 35, 36, 37, 38, 39 does not need a UART interface, such remains in the fixed amount of available UART interfaces and can be connected with another expansion block 14, 15, 28, 35, 36, 37, 38, 39. The same holds for other functional components, such as e.g. modulators (PWM, PFMOs), digital in/outputs, SPI interfaces, etc.

In order to improve the heat removal in such a measurement transmitter having a number of circuits, a housing of the measurement transmitter can be omitted. The base block 21, the power supply 25, the base module 26 and as much as desired of the plurality of expansion blocks 28, 35, 36, 37, 38, 39 are placed on two oppositely lying, lateral guiding walls as plug-in cards, whereby the ventilation of the circuits located on the named components is improved. The dimensions of such a module are kept very small and amount to 96 mm×96 mm, for instance. Thus, this module is suitable for the use in a switch panel housing.

Also a mounting on the hatrail of a switch cabinet without a housing is an option.

If a housing is, however, necessary because of environmental conditions existing where the measurement transmitter is to be installed, then other options are provided for improved heat removal from the provided circuits. For instance, the heat extraction capability of the housing is limited to a highest value of 9 W. If, for example, there are more than two high energy sensors on the measurement transmitter, and high energy sensors must be operated at a voltage of 24 V, all of these voltages cannot be produced in the housing, since otherwise the heat balance of the housing is disturbed. For this reason, a power supply, which provides 24 V for the first two sensors, is accommodated in the housing, while a second power supply, likewise providing 24 V for the additional sensors is arranged outwardly on the housing of the measurement transmitter, so that the energy is produced outside of the measurement transmitter and, thus, the heat produced by the electrical current supply circuit does not add to the heat produced by the remainder of measurement transmitter circuit.

The invention claimed is:

1. A measurement transmitter for processing input and output signals for a multisensor system, comprising:
   a processor;
   at least two sensors, each sensor embodied to measure at least one physical quantity and to communicate digitally bi-directionally;
   a partially dynamically reconfigurable logic chip including a central I/O controller;
   at least two function modules, wherein each function module is disposed in the partially dynamically reconfigurable logic chip and wherein each function module corresponds to a sensor;
   a flash memory configured to store a configuration bitstream configured to program the partially dynamically reconfigurable logic chip;
   at least two transmission lines, wherein each sensor is connected to its respective function module via a transmission line for the transmission of data; and
   at least two expansion blocks, wherein each expansion block is connected to the processor via a bus system and connected to the partially dynamically reconfigurable logic chip and wherein each expansion block has an identification unit for identification of the expansion block,
   wherein the processor is configured to read the configuration bitstream from the flash memory and to program the partially dynamically reconfigurable logic chip with the configuration bitstream,
   wherein the processor is further configured to read the identification from the respective expansion block and program the partially dynamically reconfigurable logic chip with a function module for the respective expansion block via the configuration bitstream,
   wherein the processor is further configured to connect each expansion block with its respective function module in the partially dynamically reconfigurable logic chip, and
   wherein the processor is further configured to detect a removal of the expansion block and to remove from the partially dynamically reconfigurable logic chip the function module for the respective expansion block,
   wherein the central I/O controller is configured to enable communication between the processor and the central I/O controller at a different communication rate than between the central I/O controller and each sensor, and
   wherein the function module for each sensor is configured freely programmable in the partially dynamically reconfigurable logic chip via the configuration bitstream.

2. The measurement transmitter as claimed in claim 1, wherein the central I/O controller is configured to enable communication between any sensor and its corresponding function module at a communication rate different from any other sensor and its function module.

3. The measurement transmitter as claimed in claim 1, wherein:
   the configuration of the function modules occurs via the configuration bitstream that is loaded into said partially dynamically reconfigurable logic chip.

4. The measurement transmitter as claimed in claim 1, wherein:
   one of the at least two expansion blocks includes a seat for an SD memory card via which software of said processor and/or hardware of said logic unit is updated.

5. The measurement transmitter as claimed in claim 1, wherein:
one of the at least two expansion blocks serves for operating a display and/or service unit.

6. The measurement transmitter as claimed in claim 1, wherein:
one of the at least two expansion blocks serves for control of a sample taker.

7. The measurement transmitter as claimed in claim 1, wherein:
one of the at least two expansion blocks serves for control of an analyzer.

8. The measurement transmitter as claimed in claim 1, wherein input circuitry of the sensors are provided in the at least two expansion blocks.

* * * * *